United States Patent
Kim

(10) Patent No.: US 9,189,434 B2
(45) Date of Patent: Nov. 17, 2015

(54) UNIVERSAL SERIAL BUS DEVICE AND METHOD FOR CONTROLLING AN IDLE-DELAY TIME THEREOF

(71) Applicant: SAMSUNG ELECTRONICS CO., LTD., Suwon-si, Gyeonggi-do (KR)

(72) Inventor: Yul Gon Kim, Seoul (KR)

(73) Assignee: SAMSUNG ELECTRONICS CO., LTD., Suwon-Si, Gyeonggi-Do (KR)

( * ) Notice: Subject to any disclaimer, the term of this patent is extended or adjusted under 35 U.S.C. 154(b) by 0 days.

(21) Appl. No.: 14/286,100

(22) Filed: May 23, 2014

(65) Prior Publication Data

US 2014/0359176 A1    Dec. 4, 2014

(30) Foreign Application Priority Data

May 29, 2013  (KR) .................. 10-2013-0061302

(51) Int. Cl.
  *G06F 13/12* (2006.01)
  *G06F 3/00* (2006.01)
  *G06F 13/32* (2006.01)

(52) U.S. Cl.
  CPC .................................. *G06F 13/32* (2013.01)

(58) Field of Classification Search
  CPC .. G06F 1/266; G06F 1/325; G06F 2213/0042
  USPC ........................................................ 710/59
  See application file for complete search history.

(56) References Cited

U.S. PATENT DOCUMENTS

| | | | |
|---|---|---|---|
| 8,005,998 B2 * | 8/2011 | Liao et al. ................. 710/15 |
| 8,601,301 B1 * | 12/2013 | Arscott et al. ............. 713/320 |
| 2005/0246564 A1 * | 11/2005 | Bhesania et al. .......... 713/320 |
| 2007/0005824 A1 * | 1/2007 | Howard ..................... 710/18 |
| 2008/0052549 A1 | 2/2008 | Ichien et al. |
| 2010/0088435 A1 | 4/2010 | Abe |
| 2010/0205328 A1 * | 8/2010 | Howard ..................... 710/18 |
| 2011/0109371 A1 | 5/2011 | Kastl et al. |
| 2011/0191616 A1 | 8/2011 | Cheng |
| 2012/0151239 A1 | 6/2012 | Wang |
| 2013/0346777 A1 * | 12/2013 | Zhang et al. ............... 713/323 |

OTHER PUBLICATIONS

USB Engineering Change Notice, "USB 2.0 Link Power Management Addendum", USB 2.0 ECN: Link Power Management (LPM), pp. 1-29.

* cited by examiner

*Primary Examiner* — Titus Wong
(74) *Attorney, Agent, or Firm* — F. Chau & Associates, LLC

(57) ABSTRACT

A universal serial bus (USB) host device and a method of operating the same are provided. The method includes starting a first data transfer in an on-state, entering a suspend state when an idle-delay time elapses after the first data transfer is completed, making a transition from the suspend state to the on-state after performing a resuming operation when a second data transfer is requested, and dynamically controlling the idle-delay time based on a compared result of a current miss rate and at least two predetermined miss rates.

15 Claims, 14 Drawing Sheets

FIG. 3

| LPM State | Description |
|---|---|
| L0 (On) | In this state, the port is enabled for propagation of transaction signaling traffic. A port in L0 is either actively transmitting or receiving data (L0–Active) or able to do so but not currently transmitting or receiving information (L0–Idle). While in this state Start-of-Frame (SOF) packets are issued by the host at a rate corresponding to the speed of the client device (1ms for full-speed, 125ms for high-speed). Note, the host transmits keep alives or the USB 2.0 hub translates some SOFs into keep alives if the device connected on the downstream port is a Low-speed device. The line state during L0–Active and L0–Idle vary according link speed as does the mechanism by which the host detects device hot-removal (e.g., during SOF phase for high-speed devices). Entry to L0 is via reset or resume signaling (either from L1 or L2). |
| L1 (Sleep) | L1 is similar to L2 (below) but supports finer granularity in use. When in L1, the line state is identical to L2 (see below). Entry to L1 is started by a request to a hub or host port to transition to L1. A LPM transaction is sent to the downstream device. The requested transition can only occur if the device response with an ACK handshake (see Section 2.2)). Exit from L1 is via remote wake, resume signaling, reset signaling or disconnect.<br><br>L1 does not impose any specific power draw requirements (from VBUS) on the attached device as L2 does. Either the host or device can initiate resume signaling when in L1. Although the signaling levels of resume are the same as L2, the duration of the signaling and transitional latencies associated with the L1 to L0 transition are much shorter (see Section 1.1). |
| L2 (Suspend) | This is the formalized name for USB 2.0 Suspend, see Section 7.1.7.6 in the USB 2.0 specification. Entry to L2 is nominally triggered by a command to a hub or host port to transition to suspend, at which point the port ceases repeating signaling down the port (and may transition the port out of high-speed mode). The device discovers the suspend condition via observing 3ms of inactivity. The resultant line state is either Low or Full-speed idle (see Section 7.1.7.6).<br><br>L2 also imposes power draw requirements (from VBUS) on the attached device (see Section 7.1.7.6). Exit from this state is via remote wake, resume signaling, reset signaling or disconnect. |
| L3 (Off) | In this state, the port is not capable of performing any data signaling. It corresponds to the powered-off, disconnected, and disabled states. |

UNIVERSAL SERIAL BUS DEVICE AND METHOD FOR CONTROLLING AN IDLE-DELAY TIME THEREOF

CROSS-REFERENCE TO RELATED PATENT APPLICATION

This application claims priority under 35 U.S.C. §119(a) to Korean Patent Application No. 10-2013-0061302, filed on May 29, 2013, in the Korean Intellectual Property Office, the disclosure of which is incorporated by reference herein.

TECHNICAL FIELD

The present inventive concept relates to a universal serial bus (USB) system, and more particularly, to a USB device and method for controlling an idle-delay time of the USB device.

DISCUSSION OF THE RELATED ART

A personal computer (PC) and a portable device such as a smart phone, a touch pad, a tablet PC, or the like may act as a USB host device. As the number of functions performed by the USB host devices and USB peripheral devices increases, power consumption by multi-core processes may also increase.

A USB host device may use several states for link power management (e.g., on-state, sleep state, suspend state, and off-state). The transition between the power states may be made when a fixed time expires. For instance, when a first fixed time expires in the sleep state, the USB host device may enter the suspend state.

The amount of time needed for data communication between the USB host device and the USB peripheral device may vary depending on various operational environments or applications. For instance, when a sleep state is maintained for a fixed idle time in an environment that data transfers occur frequently, the USB host device may have slow data response because the USB host device has to transition out of the sleep state. However, when the power management states are not used in an environment that data transfers occur rarely, the USB host device may have unnecessary power consumption.

SUMMARY

According to an exemplary embodiment of the present inventive concept, a method of operating a universal serial bus (USB) host device is provided. The method includes starting a first data transfer in an on-state, entering a suspend state when an idle-delay time elapses after the first data transfer is completed, making a transition from the suspend state to the on-state after performing a resuming operation when a second data transfer is requested, and dynamically controlling the idle-delay time based on a compared result of a current miss rate and at least two predetermined miss rates. The current miss rate is obtained based on a current suspend time in the suspend state.

In an embodiment, the current suspend time may be an elapsed period until a transition from the suspend state to the on-state after a transition from the on-state to the suspend state.

In an embodiment, the controlling of the idle-delay time may include comparing the current suspend time with a predetermined minimum suspend time, counting a miss when the current suspend time is equal to or smaller than the minimum suspend time, and counting a hit when the current suspend time is greater than the minimum suspend time. The current miss rate may be a ratio of a number of counted misses to a total number of counted misses and hits. The minimum suspend time may be a minimum time required for the USB host device to be powered on.

In an embodiment, the controlling of the idle-delay time may include increasing the idle-delay time when the current miss rate is equal to or greater than a first miss rate among the at least two predetermined miss rates. The first miss rate may be about 50%.

In an embodiment, the controlling of the idle-delay time further may include decreasing the idle-delay time when the current miss rate is smaller than a second miss rate among the at least two predetermined miss rates. The second miss rate may be smaller than the first miss rate. The second miss rate may be about 10%.

In an embodiment, the controlled idle-delay time may be applied to a next transition from the on-state to the suspend state.

According to an exemplary embodiment of the present inventive concept, a universal serial bus (USB) host device is provided. The USB host device includes a host control driver, a USB driver, and a power manager. The host control driver is configured to manage communication with a USB peripheral device and a client application of the USB host device. The USB driver is configured to perform a data transfer with one of the host control driver and the client application, and to measure a time stamp when the data transfer is performed. The power manager is configured to control the idle-delay time based on a compared result of a current miss rate and at least two predetermined miss rates. The current miss rate is determined by comparing a current suspend time with a predetermined minimum suspend time.

In an embodiment, the current suspend time may be an elapsed period until a transition from a suspend state to an on-state after a transition from the on-state to the suspend state. The minimum suspend time may be a minimum time required for the USB host device to be powered on.

In an embodiment, the power manager may include an autosuspend timer and a state detector. The autosuspend timer may be configured to report an expiry time when a predetermined autosuspend time elapses after the data transfer starts. The state detector may be configured to transmit a suspend mode notification signal to the host control driver when the autosuspend timer expires, and to transmit an on-state notification signal to the autosuspend timer after performing a resuming operation when the data transfer request is received from the host control driver.

In an embodiment, the current miss rate may be obtained by counting a miss when the current suspend time is equal to or smaller than the minimum suspend time, counting a hit when the current suspend time is greater than the minimum suspend time, and calculating a ratio of a number of counted misses to a total number of counted misses and counted hits.

In an embodiment, the power manager may include a first filter. The first filter may be configured to store a first miss rate among the at least two predetermined miss rates. The power manager may be configured to increase the idle-delay time when the current miss rate is equal to or greater than the first miss rate. The first miss rate may be about 50%.

In an embodiment, the power manager may further include a second filter. The second filter may be configured to store a second miss rate smaller than the first miss rate among the at least two predetermined miss rates. The power manager may be configured to decrease the idle-delay time when the current miss rate is smaller than the second miss rate. The second miss rate may be smaller than the first miss rate. The second miss rate may be about 10%.

In an embodiment, the controlled idle-delay time may be applied to a next transition from the on-state to the suspend state.

In an embodiment, the USB driver may include a USB packet tracer. The USB packet tracer may be configured to record the time stamp during the data transfer between the client application and the host control driver.

According to an exemplary embodiment of the present inventive concept, a method of operating a universal serial bus (USB) host device is provided. The method includes starting a first data transfer in an on-state, entering a suspend state when an idle-delay time elapses after the first data transfer is completed, making a transition from the suspend state to the on-state after a resuming time when a second data transfer is requested, and controlling the idle-delay time based on a period between the first data transfer and the second data transfer.

In an embodiment, the controlling of the idle-delay time may include using a compared result of a current miss rate and at least two predetermined miss rates. The current miss rate may be determined by comparing a current suspend time with a predetermined minimum suspend time. The current suspend time may be an elapsed period until a transition from the suspend state to the on-state after a transition from the on-state to the suspend state. The minimum suspend time may be a minimum time required for the USB host device to be powered on.

In an embodiment, the controlling of the idle-delay time may include increasing the idle-delay time when the current miss rate is equal to or greater than a first miss rate among the at least two predetermined miss rates and decreasing the idle-delay time when the current miss rate is smaller than a second miss rate among the at least two predetermined miss rates. The second miss rate may be smaller than the first miss rate.

BRIEF DESCRIPTION OF THE DRAWINGS

The above and other features of the present inventive concept will become more apparent by describing in detail exemplary embodiments thereof with reference to the attached drawings in which:

FIG. 3 is a table describing various states of a USB host device illustrated in FIG. 1;

DETAILED DESCRIPTION OF THE EMBODIMENTS

Figure 1:
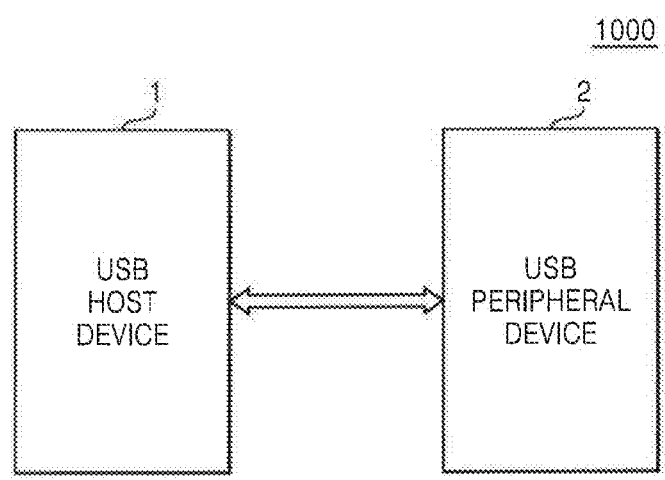
FIG. 1 is a block diagram of a USB system including a USB host device and a USB peripheral device according to an exemplary embodiment of the present inventive concept.

The present inventive concept now will be described more in detail hereinafter with reference to the accompanying drawings, in which embodiments of the present inventive concept are shown. The present inventive concept may, however, be embodied in many different forms and should not be construed as limited to the embodiments set forth herein. Rather, these embodiments are provided so that this disclosure will be thorough and complete, and will fully convey the scope of the invention. In the drawings, sizes or relative sizes of layers and regions may be exaggerated for clarity. Like numbers may refer to like elements throughout.

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

Figure 2:
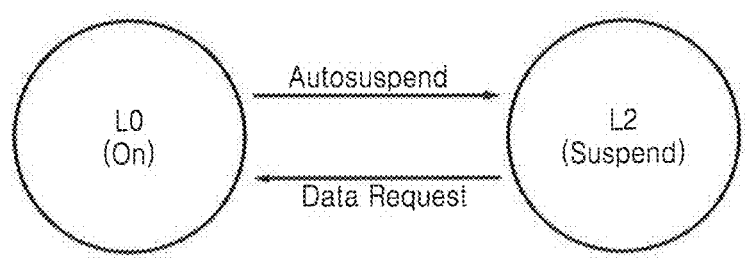
FIG. 2 is a state diagram of a USB host device illustrated in FIG. 1.

FIG. 1 is a block diagram of a USB system 1000 including a USB host device 1 and a USB peripheral device 2 according to an exemplary embodiment of the present inventive concept. FIG. 2 is a state diagram of a USB host device 1 illustrated in FIG. 1. FIG. 3 is a table describing various states of a USB host device 1 illustrated in FIG. 1. The table has been excerpted from an USB 2.0 engineering change notice (ECN); USB 2.0 Link Power Management Addendum applied to the USB 2.0 specification.

Referring to FIG. 1, a USB system 1000 includes a USB host device 1 and the USB peripheral device 2. The USB host device 1 may include a host software that corresponds to a type of the USB peripheral device 2 and communicate with the USB peripheral device 2.

The USB host device 1 may have various power states. For instance, the power states may include an on-state (L0), a sleep state (L1), a suspend state (L2), and an off-state (L3). In the L0 state, data is either actively transferred or capable of being transferred. In the L2 state, the data transfer is suspended for at least a predetermined time and power is supplied. The USB 2.0 standard specification and the USB 2.0 ECN will be referred to for detailed description of the aforementioned states.

Referring to FIG. 2, the USB host device 1 remains in the L0 state when data is transmitted from the USB peripheral device 2. After the data transmission from the USB peripheral device 2 finishes, the USB host device 1 has an idle-delay time before making a transition to the L2 state. When the idle-delay time elapses, the USB host device 1 enters the L2 state via autosuspend mode. When a data transfer is requested from the USB peripheral device 2, the USB host device 1 in the L2 state makes a transition to the L0 state to resume the data transfer.

When the data transfer is completed and the idle-delay time elapses, the USB host device 1 enters the L2 state. The idle-delay time may depend on the type of the USB peripheral device 2 or the system software included in the USB host device 1.

For instance, when the USB host device 1 transfers data of 3G, LTE, or Wi-Fi, a communication period may be short. In this case, the idle-delay time may be increased to prevent the USB host device 1 from switching too quickly to the L2 state to increase data response time. When the USB host device 1 performs a reading/writing operation from/in a USB storage device, the reading/writing may be irregular and long. Thus, the idle-delay time may be decreased to lead to a fast transition to the L2 state to reduce the power consumption of the USB host device 1.

Figure 4:
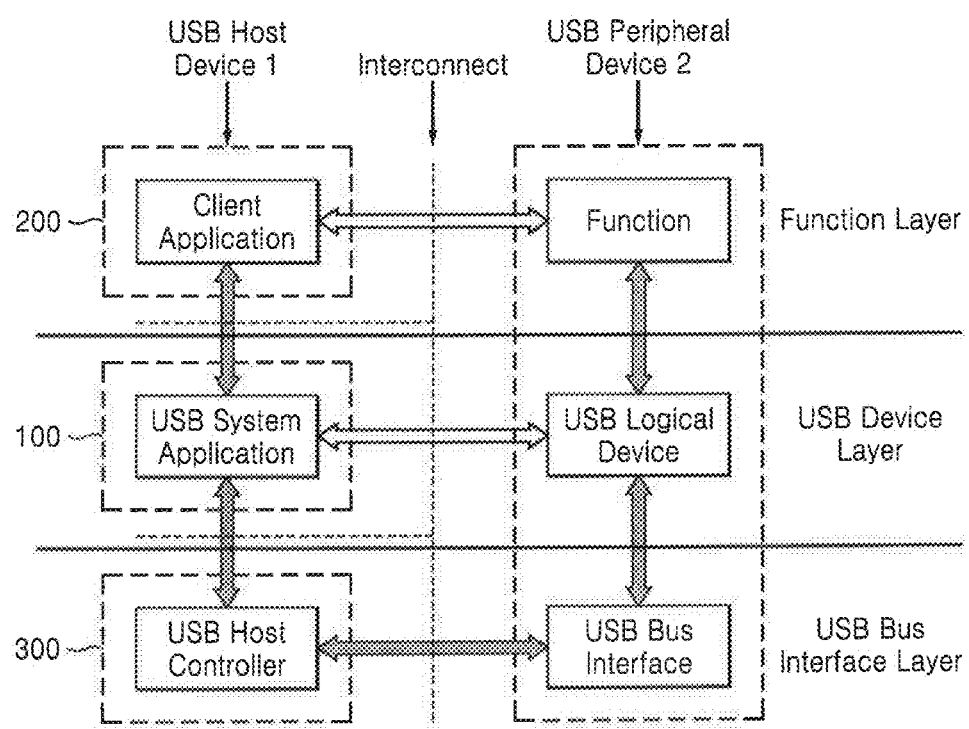
FIG. 4 is a block diagram of an interlayer communication model of a USB system illustrated in FIG. 1.
Figure 5:
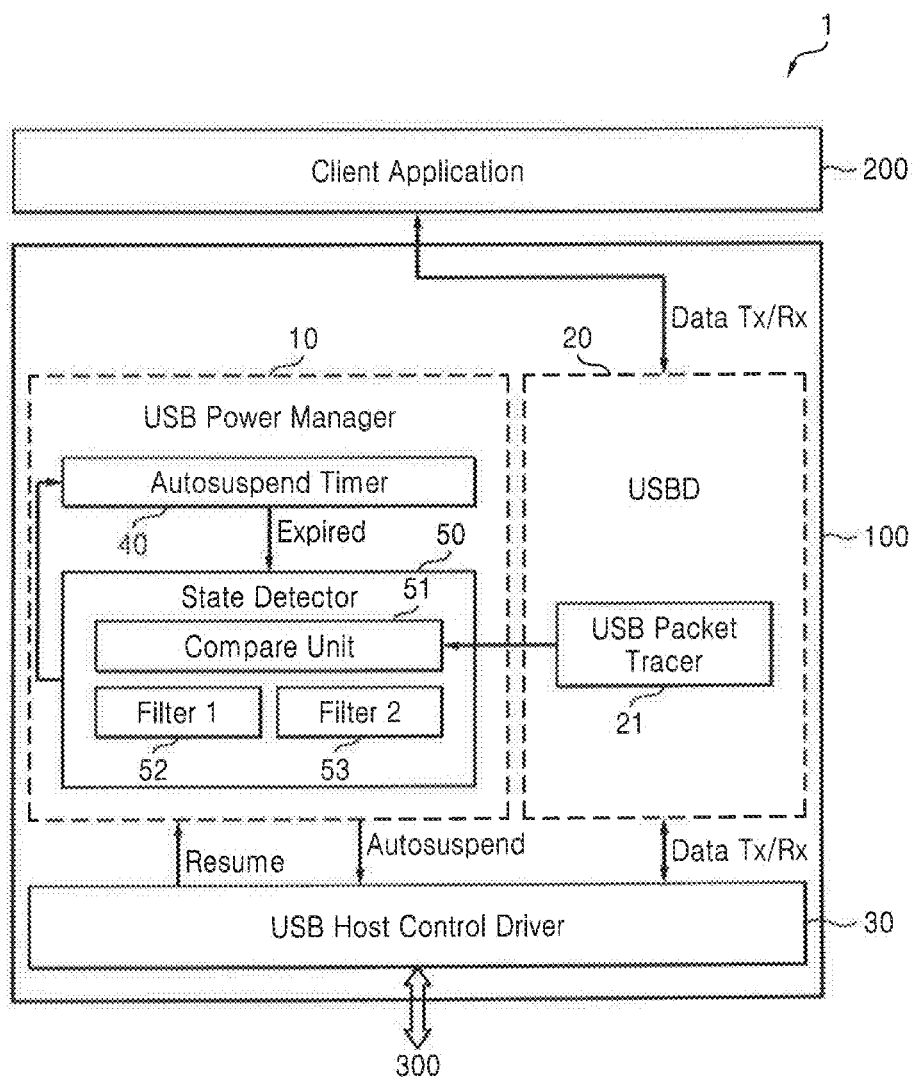
FIG. 5 is a detailed block diagram of a USB function layer and a USB device layer in a USB host device illustrated in FIG. 4.

FIG. 4 is a block diagram of an interlayer communication model of a USB system 1000 illustrated in FIG. 1. FIG. 5 is a detailed block diagram of a USB function layer and a USB device layer in a USB host device 1 illustrated in FIG. 4.

Referring to FIG. 4, each of the USB host device 1 and the USB peripheral device 2 may include a function layer, a USB device layer, and a USB bus interface layer. The USB host device 1 includes a client application 200 in the function layer, a USB system application 100 in the USB device layer, and a USB host controller 300 in the USB bus interface layer. The USB peripheral device 2 includes a function module in the function layer, a USB logical device in the USB device layer, and a USB bus interface in the USB bus interface layer.

In FIG. 4, the shaded arrows denote actual data transfer flows between the USB host device 1 and the USB peripheral device 2. The opened arrows denote logical communication flows between the USB host device 1 and the USB peripheral device 2. For example, the USB host device 1 and the USB peripheral device 2 may perform the actual data transfer through physical wires or a wireless channel, and may perform logical communications according to predetermined protocols in the USB host device 1 based on the environment pertaining to the USB peripheral device 2.

Referring to FIG. 5, the USB system application 100 of the USB host device 1 includes a USB power manager 10, a USB driver (USBD) 20, and a USB host control driver 30. The USB driver (USBD) 20 provides a basic host interface. For example, the USB driver (USBD) 20 receives data processed in the client application 200 and transmits the data to the USB host control driver 30. The USB driver (USBD) 20 may include a USB packet tracer 21. When a data transfer is requested between the client application 200 and the USB host control driver 30, the USB packet tracer 21 informs the USB power manager 10 of the request of the data transfer.

The USB power manager 10 controls the power state of the USB host device 1 depending on whether a data transfer is requested between the USB peripheral device 2 and the USB host device 1. The USB power manager 10 includes an autosuspend timer 40 and a state detector 50.

The autosuspend timer 40 counts an autosuspend time. When the autosuspend time elapses, the autosuspend timer 40 transmits an expiry time when the autosuspend timer expires to the state detector 50. The state detector 50 receives a time stamp provided from the USB packet tracer 21; compares a time obtained by adding the idle-delay time to the time stamp with an autosuspend expired time; and switches the power state of the USB host device 1 to the suspend state or restarts the autosuspend timer 40. The time stamp received from the USB packet tracer 21 represents a most recent time (hereafter, refer to as "last time stamp") when the USB peripheral device 2 accessed a USB host device 1.

The state detector may transmit a suspend mode notification signal to the host control driver when the autosuspend timer 40 expires and may transmit an on-state notification signal to the autosuspend timer 40 after performing a resuming operation when receiving a request of the data transfer from the host control driver.

The state detector 50 includes a first filter 52, a second filter 53, and a compare unit 51. The first filter 52 has a first suspend time calculated with a first time window and the second filter 53 has a second suspend time calculated with a second time window. For example, when data transfer is periodically requested, the idle-delay time may be gradually decreased using the first time window. When data transfer requiring high throughput is requested, the idle-delay time may be quickly increased using the second time window. Although only two filters are illustrated in FIG. 5, the present inventive concept is not limited thereto. For example, the number of filters may be more than 2 in an embodiment.

The compare unit 51 receives and stores the last time stamp provided from the USB packet tracer 21. The compare unit 51 compares the autosuspend expired time with a time obtained by adding the idle-delay time to the last time stamp, updates the last time stamp when there is a transition of the power state of the USB host device 1, and restarts the autosuspend timer 40.

The USB host control driver 30 maps various host controllers to be suitable to the USB system application 100. For example, the USB host control driver 30 may facilitate the connection between the USB peripheral device 2 and the client application 200 of the USB host device 1, without recognizing a type of the USB peripheral device 2.

Figure 6:
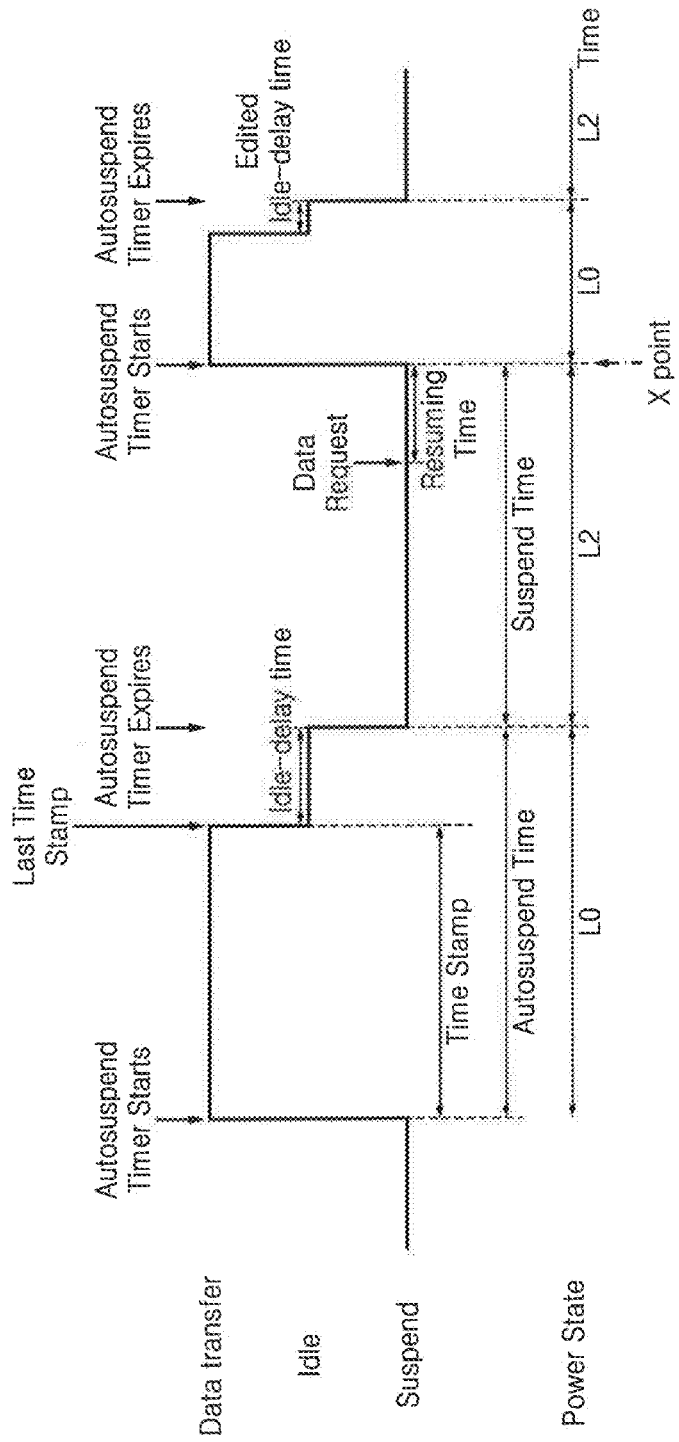
FIG. 6 is a timing chart showing an operation of a USB host device according to an exemplary embodiment of the present inventive concept.

FIG. 6 is a timing chart showing an operation of the USB host device 1 according to an exemplary embodiment of the present inventive concept. Referring to FIGS. 5 and 6, the USB host device 1 is set to the L0 state when data starts to be transferred from the USB peripheral device 2. When the L0 state starts, the autosuspend timer 40 starts to count an autosuspend time. When the data is transferred from the USB peripheral device 2, the USB host device 1 records a time stamp at predetermined time intervals using the USB packet tracer 21. When the data transfer from the USB peripheral device 2 is completed, the time stamp is not recorded any more. When the autosuspend time elapses, the autosuspend timer 40 expires. The idle-delay time may be a value predetermined according to a previous data transfer comparison result. When the autosuspend timer 40 expires, a time when the autosuspend timer 40 expires is compared with a time when the idle-delay time elapses after the last time stamp. According to the comparison result, the USB host device 1 makes a transition from the L0 state to the L2 state (i.e., suspend state). When a data transfer is requested from the USB peripheral device 2 during the suspend state, the USB host device 1 performs a resuming operating during a resuming time before starting the data transfer. At a time X when the resuming time elapses, the USB host device 1 is reset to the L0 state, restarts the autosuspend timer 40 to count an autosuspend time, and repeats the above-described procedures until the data transfer ends.

The USB host device 1 checks a miss rate or a hit rate using the filters 52 and 53 in the L0 state and the L2 state. The miss rate (hereafter, refer to as "current miss rate") or the hit rate is checked by comparing a measured suspend time (when the USB host device 1 is in the L2 state) with a predetermined minimum suspend time and counting a hit or a miss during a particular time window. The idle-delay time is adjusted according to the checked miss rate or hit rate and the adjusted idle-delay time is applied to a next transition from the L0 state to the L2 state.

Figure 7:
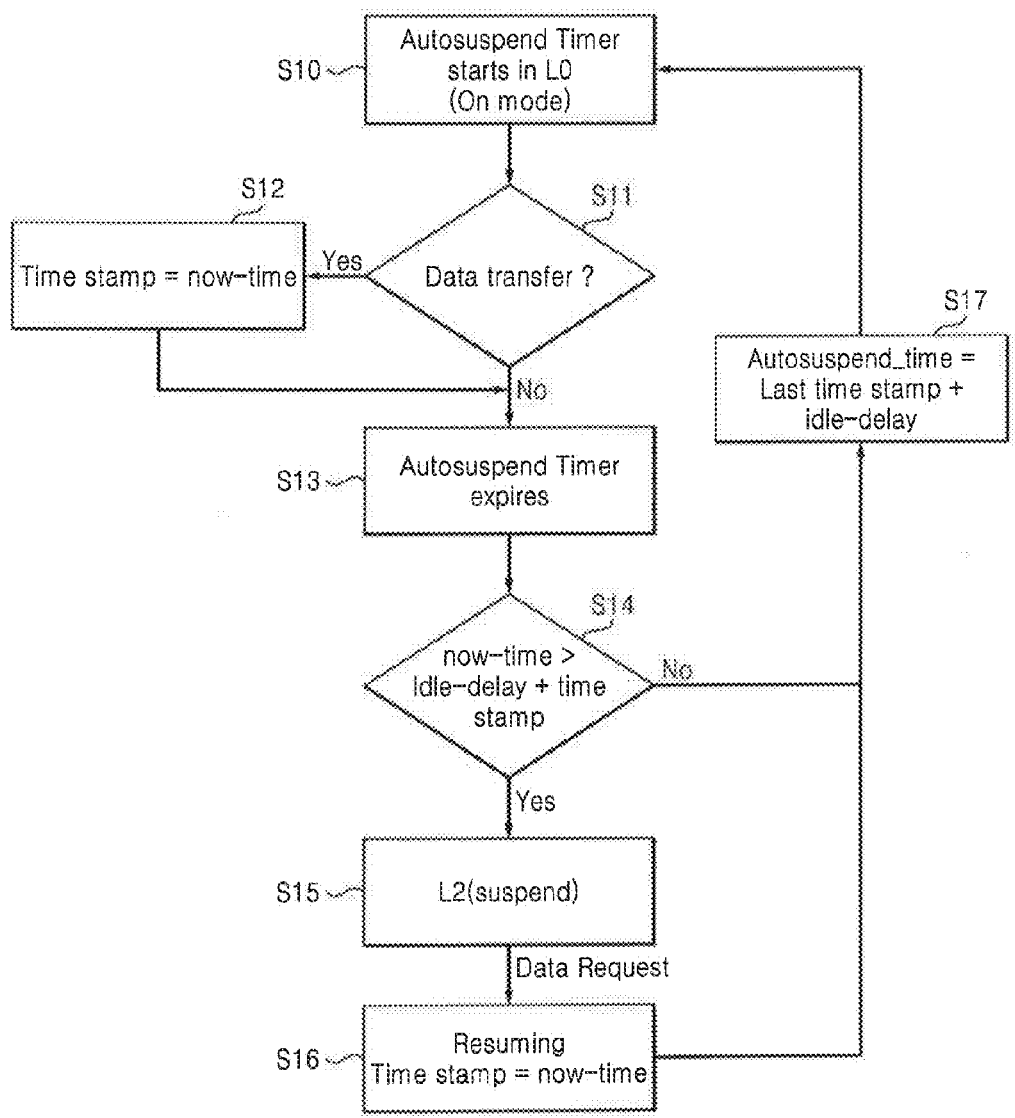
FIG. 7 is a flowchart illustrating a method of operating a USB host device according to an exemplary embodiment of the present inventive concept.

FIG. 7 is a flowchart illustrating a method of operating the USB host device 1 according to an exemplary embodiment of the present inventive concept. Referring to FIG. 7, when the USB host device 1 enters the L0 state since a data transfer is requested, the autosuspend timer 40 starts to count an autosuspend time in operation S10.

When the data transfer is completed in operation S11, the USB packet tracer 21 records the last time stamp in operation S12. When there is no data transfer, the USB packet tracer 21 might not record the last time stamp. When the autosuspend time elapses, the autosuspend timer 40 expires in operation S13. When a time (i.e., last time stamp+idle-delay time) at which the predetermined idle-delay time elapses after the last time stamp comes earlier than a now-time at which the autosuspend timer 40 expires in operation S14, the USB host device 1 makes a transition to the L2 state in operation S15. When the USB host device 1 receives a data transfer request in the L2 state, the USB packet tracer 21 resumes recording a time stamp in operation S16.

However, when the time (i.e., last time stamp+idle-delay time) at which the predetermined idle-delay time elapses after the last time stamp comes later than the now-time at which the autosuspend timer 40 expires in operation S14, the USB host device 1 may determine that a data transfer may be requested soon, may reset the autosuspend time to the time (i.e., last time stamp+idle-delay time) obtained by adding the idle-delay time to the last time stamp, and may remain in the L0 state in operation S17. Accordingly, when the data transfer is requested periodically and the idle delay time is fixed, or the requested data transfer requires high throughput, a transition between the L0 state and the L2 state may result in slow data response and an unnecessary high power consumption of the USB host device 1.

Figure 8:
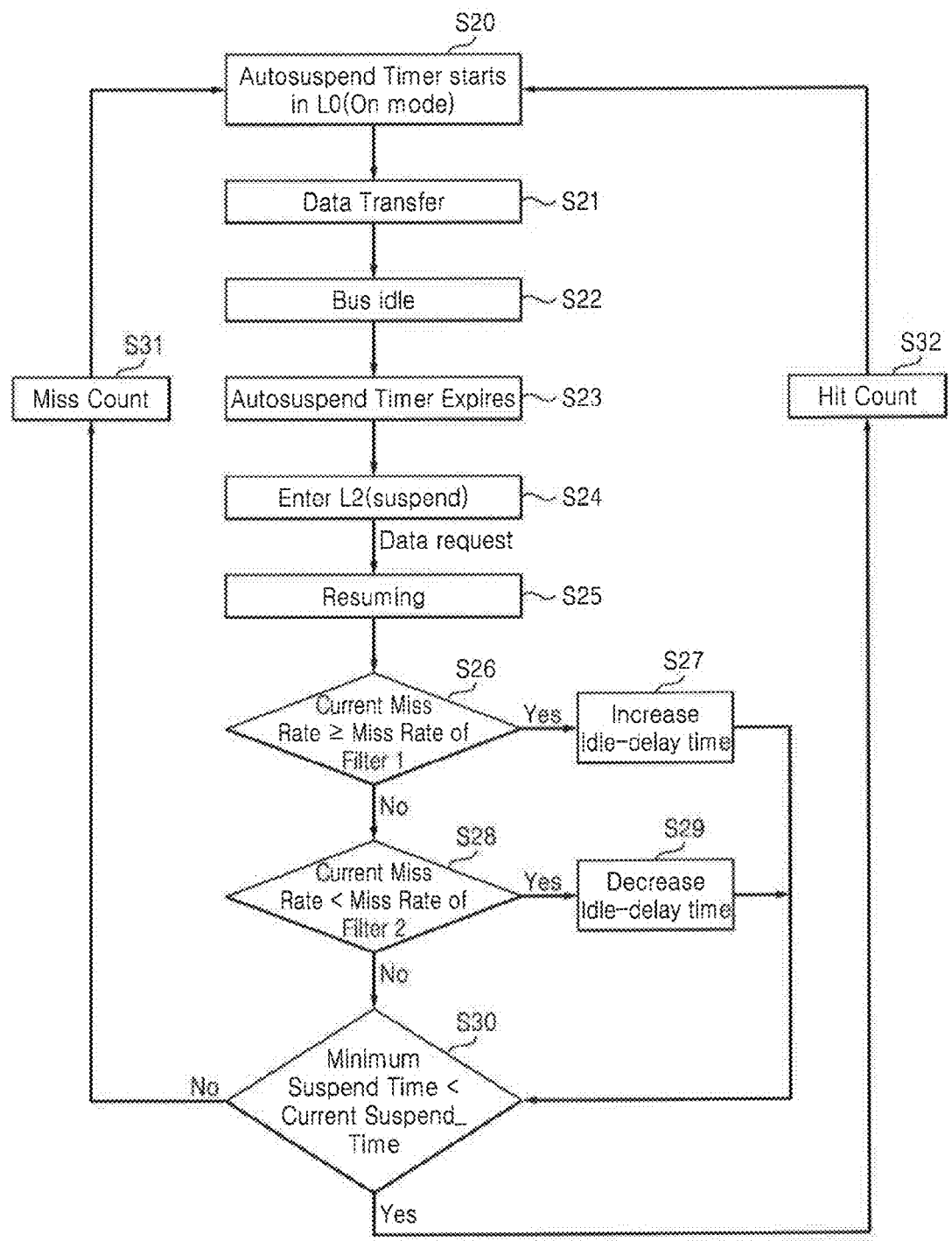
FIG. 8 is a flowchart illustrating a method of operating a USB host device according to an exemplary embodiment of the present inventive concept.

FIG. 8 is a flowchart illustrating a method of operating the USB host device 1 according to an exemplary embodiment of the present inventive concept. Referring to FIG. 8, when the USB host device 1 enters the L0 state since a data transfer starts, the autosuspend timer 40 starts counting an autosuspend time in operation S20.

When the data transfer is continued in operation S21, the USB packet tracer 21 records a time stamp. When there is no data transfer, the USB packet tracer 21 might not record a time stamp and the USB host device 1 may become idle in operation S22. When the autosuspend timer 40 expires, the autosuspend timer 40 stop counting the autosuspend time in operation S23. When the autosuspend timer 40 stop counting, the USB host device 1 enters the L2 state in operation S24. When a data transfer is requested when the USB host device 1 is in the L2 state, the USB host device 1 performs a resuming operation in operation S25 and make a transition to the L0 state. Before making a transition to the L0 state after the resuming operation, the USB host device 1 compares a current miss rate with a predetermined miss rate of the first filter 52 in operation S26.

For example, when the current miss rate is equal to or greater than the predetermined miss rate of the first filter 52, the idle-delay time may be increased in operation S27. For example, when the first filter 52 has a first time window that is adaptive to periodical data transfers and the current miss rate is equal to or greater than the predetermined miss rate of the first filter 52, the USB host device 1 may determine that the idle-delay time in the L0 state is short, and may increase the idle-delay time. In addition, before switching to the L0 state after the resuming operation, the USB host device 1 compares the current miss rate with a predetermined miss rate of the second filter 53 in operation S28, and when the current miss rate is smaller than the predetermined miss rate of the second filter 53, the idle-delay time is decreased in operation S29. For example, when the second filter 53 has a second time window that is adaptive to a data transfer requiring a high throughput and the current miss rate is less than the predetermined miss rate of the second filter 53, the USB host device 1 may determine that the idle-delay time in the L0 state is long, and may decrease the idle-delay time.

The USB host device 1 compares a current suspend time with a predetermined minimum suspend time and counts a hit or a miss in operation S30. For example, the USB host device 1 counts a hit when the current suspend time is greater than minimum suspend time in operation S32. The USB host device 1 counts a miss when the current suspend time is equal to or smaller than the minimum suspend time in operation S31. The hit rate is a ratio of the number of counted hits) to the total number of the counted hits and the counted misses. The miss rate is a ratio of the number of counted misses to the total number of the counted hits and the counted misses.

Since the idle-delay time is adjusted according to the characteristic of the data transfer, power consumption of the USB host device 1 may be lowered or data response speed thereof may be increased.

Figure 9:
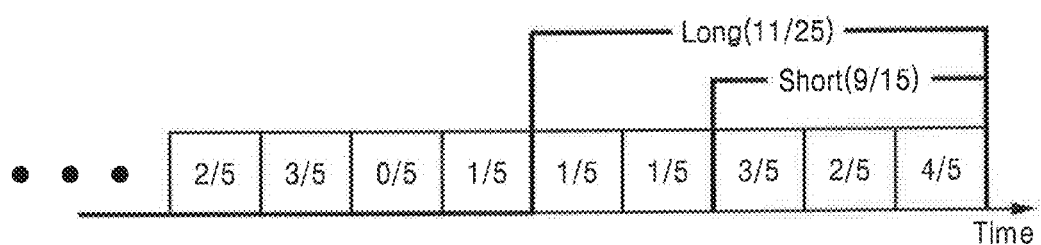
FIG. 9 is a conceptual diagram for explaining an current miss rate according to an exemplary embodiment of the present inventive concept.
Figure 10:
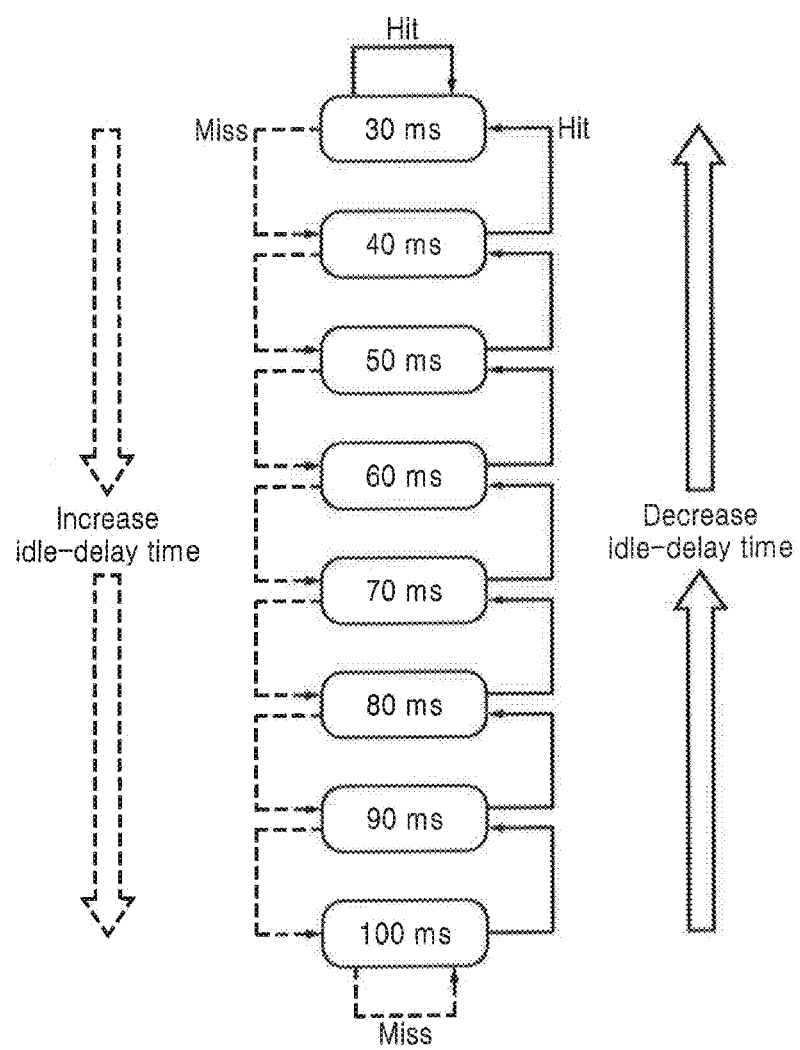
FIG. 10 is a diagram for explaining a current miss rate according to an exemplary embodiment of the present inventive concept.
Figure 11:
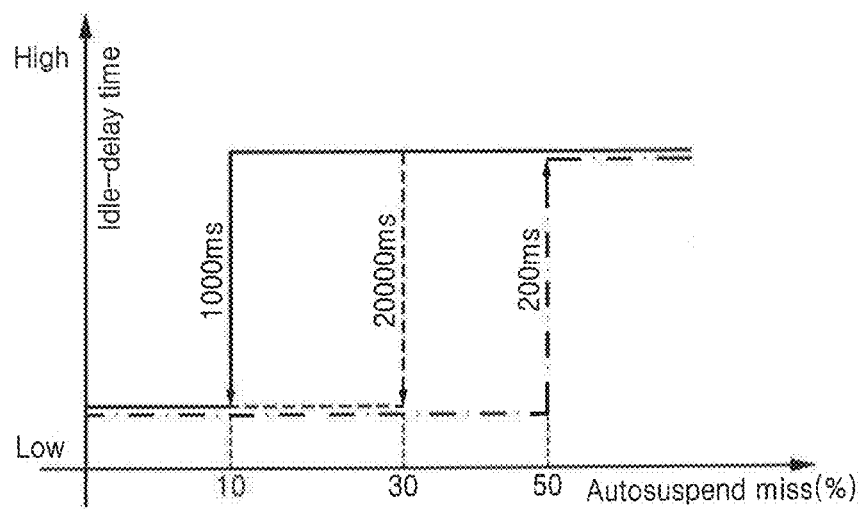
FIG. 11 is a graph illustrating relationship between a current miss rate and an idle-delay time to explain filters illustrated in FIG. 5.
Figure 12:
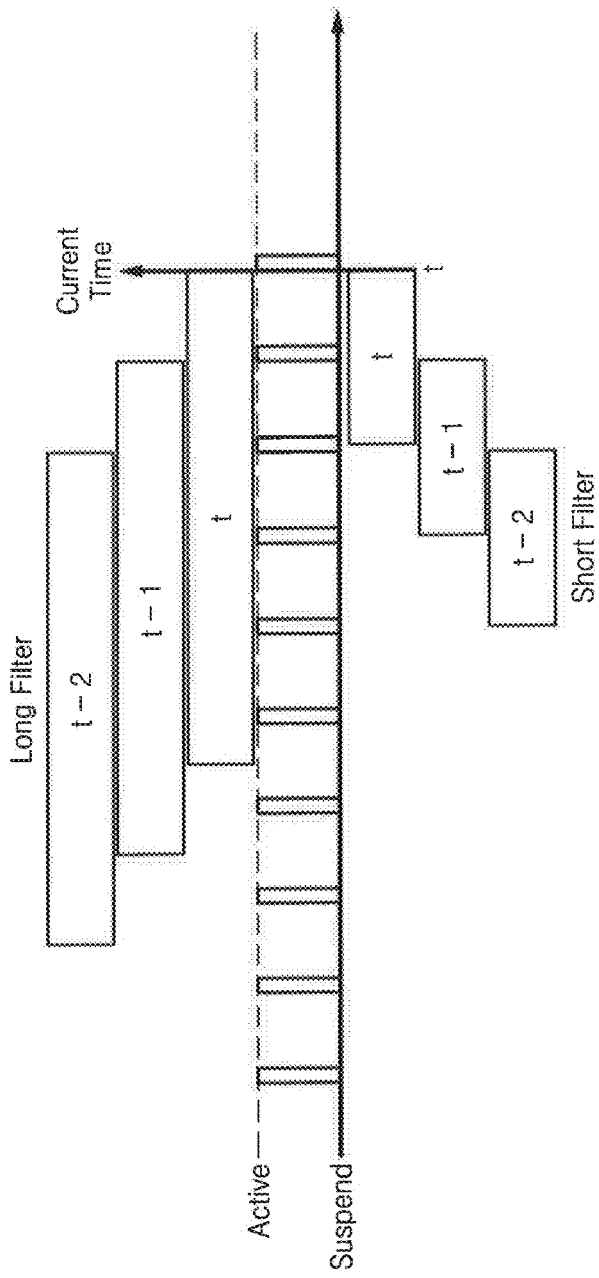
FIG. 12 is a graph of a time versus a state of a USB host device for explaining operations of filters illustrated in FIG. 5.

FIG. 9 is a conceptual diagram for explaining a current miss rate according to an exemplary embodiment of the present inventive concept. FIG. 10 is a diagram for explaining a current miss rate according to an exemplary embodiment of the present inventive concept. FIG. 11 is a graph illustrating the relationship between the current miss rate and the idle-delay time to explain the filters 52 and 53 illustrated in FIG. 5. FIG. 12 is a graph of time versus state for explaining the operation of the filters 52 and 53 illustrated in FIG. 5.

Referring to FIG. 9, it is assumed that a total number of counted hits and misses is 5. In the fractions illustrated in FIG. 9, denominators are the total number of counted hits and misses and numerators are the counted misses.

When the current miss rate is 1/5, the state detector 50 may use a long filter having a first predetermined miss rate. The current miss rate may be compared with the first predetermined miss rate to adjust the idle-delay time. When the current miss rate is 2/5 or greater, the state detector 50 may use a short filter having a second predetermined miss rate. The current miss rate may be compared with the second predetermined miss rate to adjust the idle-delay time. The long filter and the short filter are illustrated in FIG. 12. The long filter has a low idle expiry time filter and the short filter has a high idle expiry time filter in FIG. 12.

Referring to FIG. 10, for example, when the current miss rate based on the autosuspend time is equal to or greater than 50%, the idle-delay time in the L0 state may be determined to be short and thus, the idle-delay time may be increased. When the current miss rate based on the autosuspend time is less than 10%, the idle-delay time in the L0 state may be determined to be long and thus, the idle-delay time may be decreased. Although minimum and maximum values of the idle-delay time are 30 ms and 100 ms, respectively, and the idle-delay time is changed by 10 ms as illustrated in FIG. 10, an embodiment of the present inventive concept is not limited to thereto.

Referring to FIG. 11, the idle-delay time may be adjusted by comparing the current miss rate with predetermined miss rates of filters (e.g., a short or a long filter) having different time windows. For example, the current miss rate may be checked based on each of the different time windows and as a result, the idle-delay time may be increased or decreased. As described above with reference to FIG. 8, the current miss rate is determined based on a compared result a current suspend time in the L2 state and the predetermined minimum suspend time. The USB host device 1 obtains the current suspend time by comparing a time of the transition from the L2 state to the L0 state with a time of the transition from the L0 state to the L2 state. The minimum suspend time is a minimum time required for the USB host device 1 to have advantage on power consumption.

For example, when the current miss rate is equal to or greater than 50%, the idle-delay time may be increased by 200 ms based on a compared result of the current miss rate and a first predetermined miss rate of a short filter. When the current miss rate is less than 10%, the idle-delay time may be decreased by 1000 ms based on a compared result of the current miss rate and a second predetermined miss rate of a long filter. When the current miss rate is 10% to 30%, a filter having a different time window from those of the short and long filters may be added and thus, the idle-delay time may be decreased by 2000 ms. As a result, the idle-delay time may be dynamically increased or decreased to be optimized according to an active data transfer period of the USB host device 1.

Figure 13:
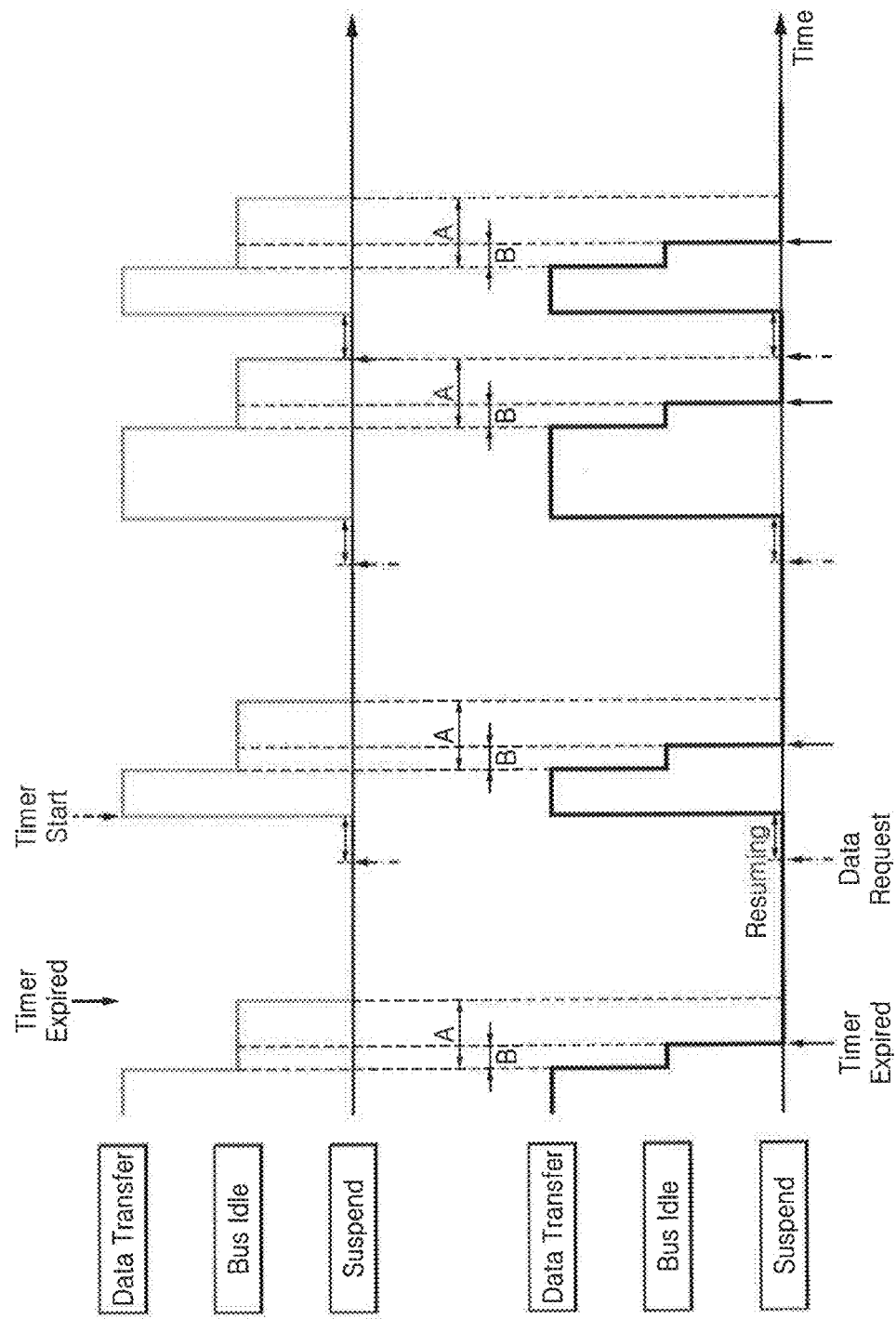
FIG. 13 is a timing chart illustrating an operation of a USB host device according to an exemplary embodiment of the present inventive concept.

FIG. 13 is a timing chart showing an operation of the USB host device 1 according to an exemplary embodiment of the present inventive concept. Referring to FIG. 13, it is assumed that the USB host device 1 and the USB peripheral device 2 perform data transfers periodically. When the idle-delay time elapses after the last time stamp, the autosuspend timer 40 expires. Thereafter, the USB host device 1 makes a transition from the L0 state to the L2 state. When the USB host device 1 receives a data request in the L2 state, the USB host device 1 enters the L0 state after performing a resuming operation and restarts the autosuspend timer 40. Referring to the upper part of FIG. 13, the USB host device 1 may be in idle state during the idle-delay time (e.g., A) although no data transfer occurs. As the idle-delay time is increased, amount of power consumption in the USB host device 1 may be increased. Thus, the idle-delay time may be decreased from A to B using a current miss rate, as shown in the lower part of FIG. 13 and the power consumption during the idle state may be reduced. As a result, power consumption of the USB host device 1 or the USB peripheral device 2 during the idle state may be reduced.

Figure 14:
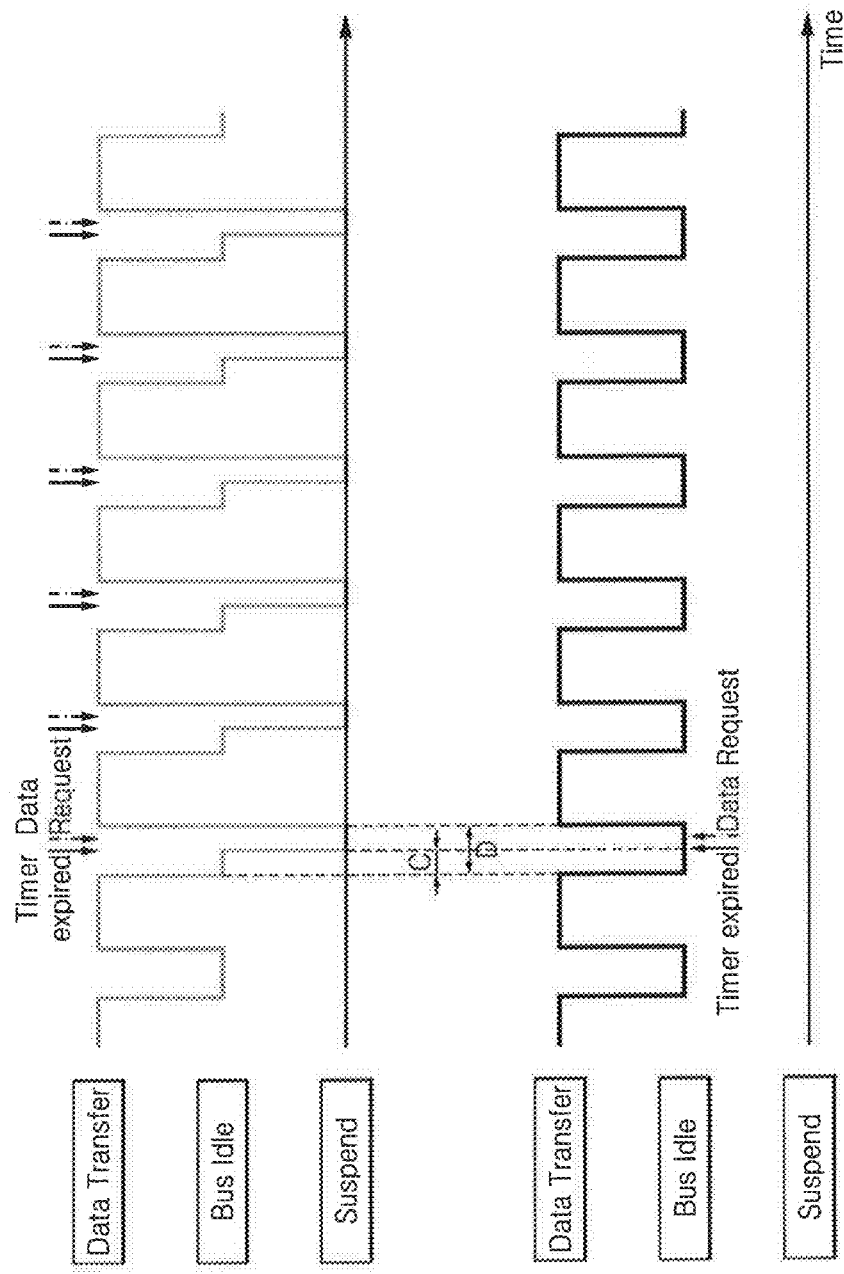
FIG. 14 is a timing chart illustrating an operation of a USB host device according to an exemplary embodiment of the present inventive concept.

FIG. 14 is a timing chart showing an operation of the USB host device 1 according to an exemplary embodiment of the present inventive concept. It is assumed that the USB host device 1 and the USB peripheral device 2 perform data transfer that requires a high throughput. When the idle-delay time elapses after the last time stamp, the autosuspend timer 40 expires. Thereafter, the USB host device 1 makes a transition from the L0 state to the L2 state. When the USB host device 1 receives a data request in the L2 state, the USB host device 1 enters the L0 state after performing a resuming operation and restarts the autosuspend timer 40. Referring to the upper part of FIG. 14, for example, when the idle-delay time (e.g., C) is shorter than an interval between the data transfers, the USB host 1 may enter the L0 state via the L2 state (i.e., suspend state) from the idle state. When the idle-delay time is increased from C to D using a current miss rate, as shown in the lower part of FIG. 14, the USB host device 1 may enter the L0 state after performing the resuming operation without entering the L2 state (i.e., suspend state). As a result, the data response speed of the USB host device 1 may be increased.

The present inventive concept may also be embodied as computer-readable codes on a computer-readable recording medium. The computer-readable recording medium may include a data storage device such as a read-only memory (ROM), a random-access memory (RAM), CD-ROMs, magnetic tapes, floppy disks, optical data storage devices, or the like. The data storage device may store data and may be read by a computer system.

The computer-readable recording medium may be distributed over networks coupled computer systems and the computer-readable codes may be stored and executed in a distributed fashion. Also, functional programs, codes, and code segments to accomplish the present inventive concept may be easily construed.

As described above, according to an exemplary embodiment of the present inventive concept, a USB system dynamically controls an idle-delay time according to the current miss rate and an optimal data transfer in accordance with characteristics of a data transfer may be performed. For example, the USB host device 1 may increase a data response speed for the data transfer requiring a high throughput by adjusting the idle-delay time to be short. Further the USB host device 1 may reduce its power consumption for the data transfer occurring periodically by adjusting the idle-delay time to be long.

Although the present inventive concept has been particularly shown and described with reference to exemplary embodiments thereof, it will be understood that various changes in forms and details may be made therein without departing from the spirit and scope of the present inventive concept as defined by the following claims. Therefore, it may be understood that the foregoing is illustrative of the present inventive concept and should not to be construed as being limited to the specific embodiments disclosed herein.

What is claimed is:

1. A method of operating a universal serial bus (USB) host device, the method comprising:
   starting a first data transfer in an on-state;
   entering a suspend state when an idle-delay time elapses after the first data transfer is completed;
   making a transition from the suspend state to the on-state after performing a resuming operation when a second data transfer is requested; and
   controlling the idle-delay time based on a compared result of a current miss rate and at least two predetermined miss rates,
   wherein the current miss rate is obtained based on a current suspend time in the suspend state,
   wherein the current suspend time is an elapsed period until a transition from the suspend state to the on-state after a transition from the on-state to the suspend state,
   wherein the controlling of the idle-delay time comprises:
   comparing the current suspend time with a predetermined minimum suspend time;
   counting a miss when the current suspend time is equal to or smaller than the minimum suspend time; and
   counting a hit when the current suspend time is greater than the minimum suspend time, and
   wherein the current miss rate is a ratio of a number of counted misses to a total number of counted misses and hits.

2. The method of claim 1, wherein the controlling of the idle-delay time comprises increasing the idle-delay time when the current miss rate is equal to or greater than a first miss rate among the at least two predetermined miss rates.

3. The method of claim 2, wherein the controlling of the idle-delay time further comprises decreasing the idle-delay time when the current miss rate is smaller than a second miss rate among the at least two predetermined miss rates, and wherein the second miss rate is smaller than the first miss rate.

4. The method of claim 2, wherein the first miss rate is 50%.

5. The method of claim 3, wherein the second miss rate is 10%.

6. The method of claim 1, wherein the controlled idle-delay time is applied to a next transition from the on-state to the suspend state.

7. A universal serial bus (USB) host device comprising:
a host control driver configured to manage communication with a USB peripheral device and a client application of the USB host device;
a USB driver configured to perform a data transfer with one of the host control driver and the client application, and to measure a time stamp when the data transfer is performed; and
a power manager configured to control the idle-delay time based on a compared result of a current miss rate and at least two predetermined miss rates,
wherein the current miss rate is determined by comparing a current suspend time with a predetermined minimum suspend time,
wherein the current suspend time is an elapsed period until a transition from a suspend state to an on-state after a transition from the on-state to the suspend state, and
wherein the current miss rate is obtained by:
counting a miss when the current suspend time is equal to or smaller than the minimum suspend time;
counting a hit when the current suspend time is greater than the minimum suspend time; and
calculating a ratio of a number of counted misses to a total number of counted misses and counted hits.

8. The USB host device of claim 7, wherein the power manager comprises:
an autosuspend timer configured to report an expiry time when a predetermined autosuspend time elapses after the data transfer starts; and
a state detector configured to transmit a suspend mode notification signal to the host control driver when the autosuspend timer expires, and to transmit an on-state notification signal to the autosuspend timer after performing a resuming operation when the data transfer request is received from the host control driver.

9. The USB host device of claim 7, wherein the power manager comprises a first filter configured to store a first miss rate among the at least two predetermined miss rates, and
wherein the power manager is configured to increase the idle-delay time when the current miss rate is equal to or greater than the first miss rate.

10. The USB host device of claim 9, wherein the first miss rate is 50%.

11. The USB host device of claim 9, wherein the power manager further comprises a second filter configured to store a second miss rate smaller than the first miss rate among the at least two predetermined miss rates,
wherein the power manager is configured to decrease the idle-delay time when the current miss rate is smaller than the second miss rate, and
wherein the second miss rate is smaller than the first miss rate.

12. The USB host device of claim 7, wherein the controlled idle-delay time is applied to a next transition from the on-state to the suspend state.

13. The USB host device of claim 7, wherein the USB driver comprises a USB packet tracer configured to record the time stamp during the data transfer between the client application and the host control driver.

14. A method of operating a universal serial bus (USB) host device, the method comprising:
starting a first data transfer of a plurality of data transfers in an on-state;
entering a suspend state when an idle-delay time elapses after the first data transfer is completed;
making a transition from the suspend state to the on-state after a resuming time when a second data transfer of the plurality of data transfers is requested; and
controlling the idle-delay time based on intervals between the plurality of data transfers,
wherein the controlling of the idle-delay time comprises using a compared result of a current miss rate and at least two predetermined miss rates,
wherein the current miss rate is determined by comparing a current suspend time with a predetermined minimum suspend time, and
wherein the current suspend time is an elapsed period until a transition from the suspend state to the on-state after a transition from the on-state to the suspend state.

15. The method of claim 14, the controlling of the idle-delay time comprises:
increasing the idle-delay time when the current miss rate is equal to or greater than a first miss rate among the at least two predetermined miss rates; and
decreasing the idle-delay time when the current miss rate is smaller than a second miss rate among the at least two predetermined miss rates,
wherein the second miss rate is smaller than the first miss rate.

* * * * *